May 28, 1963 E. J. SPERBER 3,091,468

TONE ARM STOP SYSTEM FOR AUTOMATIC RECORD CHANGERS

Filed Jan. 11, 1952 4 Sheets-Sheet 1

INVENTOR
EDWARD J. SPERBER
BY H. L. Newton
ATTORNEY

TONE ARM STOP SYSTEM FOR AUTOMATIC RECORD CHANGERS

INVENTOR
EDWARD J. SPERBER
BY H.D. Muston
ATTORNEY

TONE ARM STOP SYSTEM FOR AUTOMATIC RECORD CHANGERS

Filed Jan. 11, 1952 4 Sheets-Sheet 3

INVENTOR
EDWARD J. SPERBER
BY
[signature]
ATTORNEY

May 28, 1963 E. J. SPERBER 3,091,468

TONE ARM STOP SYSTEM FOR AUTOMATIC RECORD CHANGERS

Filed Jan. 11, 1952 4 Sheets-Sheet 4

INVENTOR
EDWARD J. SPERBER
BY [signature]
ATTORNEY 3,091,468
Patented May 28, 1963

3,091,468

TONE ARM STOP SYSTEM FOR AUTOMATIC RECORD CHANGERS

Edward J. Sperber, Philadelphia, Pa., assignor to Radio Corporation of America, a corporation of Delaware Filed Jan. 11, 1952, Ser. No. 265,971
15 Claims. (Cl. 274—10)

This invention relates to drop-type automatic record changers for phonographs and the like, for playing a stack of records sequentially, and more particularly to a tone arm stop system for automatically effecting stopping of the record playing operation by movement of the record changer tone arm to a predetermined inoperative rest position after the last record of the stack has been played.

More specifically, this invention relates to automatic record changers of the type known commercially as the RCA 45–J, and as disclosed for example, in a copending application of Benjamin R. Carson, filed March 31, 1949, Ser. No. 84,502, now United States Patent 2,634,135, for Automatic Phonograph Record Playing Mechanism, and assigned to the same assignee as the present application. The record changer referred to utilizes a turntable center post of relatively large diameter, on which a stack of records may be placed for sequential playing, with the lowermost record of the stack supported adjacent its center upon a pair of retractable record supporting shoulders or shelves on opposite sides of the center post.

Periodically, at the completion of the playing of each record, a record changing cycle is automatically initiated, and a succeeding record is dropped onto the turntable to be played. The record changing apparatus housed in the center post includes the retractable shelves, a pair of cooperating record separators or record separating plates, which are withdrawn inside the center post during a record playing cycle, and a central control shaft.

The record separators and shelves with the control shaft, one end of which projects between the shelves and separators, normally rotate with the turntable and center post. Upon the completion of a record playing cycle and during the record change cycle, record changing control mechanism below the turntable operates to stop and hold the control shaft stationary with respect to the rotating turntable and center post. The shelves and separators then operate to select and drop the lowermost record to the turntable position to be played.

For stopping the control shaft, the record changing control mechanism comprises a main lever operable by a main cycle control cam integral with the turntable to engage a tooth of a star-shaped wheel fixed to the lower end of the central control shaft. When the shaft is stopped, the turntable and center post continue to rotate and the blades are cammed outwardly between the lowermost and next lowermost records of the stack, and simultaneously the shelves are withdrawn inside the center post to permit the lowermost record to drop onto the turntable or stack thereon. After the record has dropped and upon further rotation of the turntable, the stationary control shaft operates to cam the shelves outwardly and the blades inwardly so that the shelves support the remaining records of the stack. Thereafter the control cam releases the main lever to free the control shaft for continuing rotation with the turntable in the record playing cycle which follows.

During a record change cycle, the main lever also controls a mechanism for moving the tone arm in synchronism with the record changing apparatus. The mechanism raises the tone arm from the played record and moves it horizontally away from the turntable to clear a path for the succeeding record to be dropped on the turntable or on the preceding played record in the manner hereinbefore mentioned. After such record has been selected, a tone arm indexing system effects the return horizontal movement of the tone arm to a position over the outer rim of the record, whereupon the cycling control cam releases the main lever and permits the tone arm to be lowered so that the pickup stylus lowers into or engages the lead-in groove of the record.

After the last record has been played, normal record playing and record changing intervals continue to occur in the manner hereinbefore described, with the last record being played repeatedly until the tone arm is raised and moved to a tone arm rest, or until additional records are placed on the center post and played in the manner hereinbefore mentioned. While the above operation, involving repetitive playing of the last record, permits certain simplification of the record change mechanism and lowers production cost, means for automatically stopping the playing operation of the record changer after the last record has been played is desirable.

Accordingly, it is an object of this invention, to provide improved means for automatically stopping the playing operation of a record changer of the type having a central spindle for controlling movement of a stack of records onto a turntable, without appreciably complicating the construction or normal functioning and operation thereof.

It is a further object of this invention to provide an improved stop system for a record changer of the type referred to, which functions to position and hold a tone arm in the rest position after the last record has been played, thereby to prevent repeat playing of said last record.

During record change cycles in an automatic record changer of the type referred to, the tone arm as hereinbefore mentioned, is moved to an outermost position to clear the succeeding record to be dropped onto the turntable, and in that position is directly over the tone arm rest temporarily, before being returned to the playing position on the next record. It is an object of this invention, therefore, to provide an improved and simplified automatic tone arm stop system which effects placement and holding of the tone arm on the tone arm rest thereby to effect stopping of the playing operation directly from the position in the change cycle as above referred to after the last record of a stack has been played and the change cycle is completed.

Tone arm stop systems heretofore known for this purpose do not meet present day cost and space requirements which must be kept at a minimum, and accordingly, it is also a further object of this invention, to provide an automatic tone arm stop system of compact design, for automatic record changers of the central-spindle, drop-type, which employs a minimum number of component parts of simple low-cost construction.

Automatic drop-type record changers which employ an enlarged turntable center post or spindle, are particularly adapted, because of space available therein, to be provided with means for detecting or sensing the presence or absence of records on the center post. In accordance with the invention, the sensing element may act as a control member for a tone arm stop system.

Accordingly, it is another and important object of this invention to provide a tone arm stop system for enlarged-spindle, automatic, drop-type record changers which provides for control or sensing by means wholly carried by or housed within the turntable spindle or center post.

In accordance with one form of this invention, an automatic tone arm stop system includes a gravity-actuated sensing member in a record changer turntable spindle or center post over which successive lowermost records of a stack are sequentially selected and fed to the turntable to be played. The successive lowermost records normally maintain the sensing member in an inoperative position with respect to a cooperating lever system. The sensing member is releasable after the last record of the stack has been selected for playing, to move to an operative position with respect to the lever system, which is then actuated by the sensing member and moved to a predetermined position for operation, after the last record has been played, to prevent further record playing operation of the changer.

The invention will further be understood from the following description with reference to the accompanying drawings, and its scope is pointed out in the appended claims. In the drawings, FIGURE 1 is a side view, partly in section and partly broken away, of an automatic record changer provided with a tone arm stop system in accordance with the invention;

Figure 1:
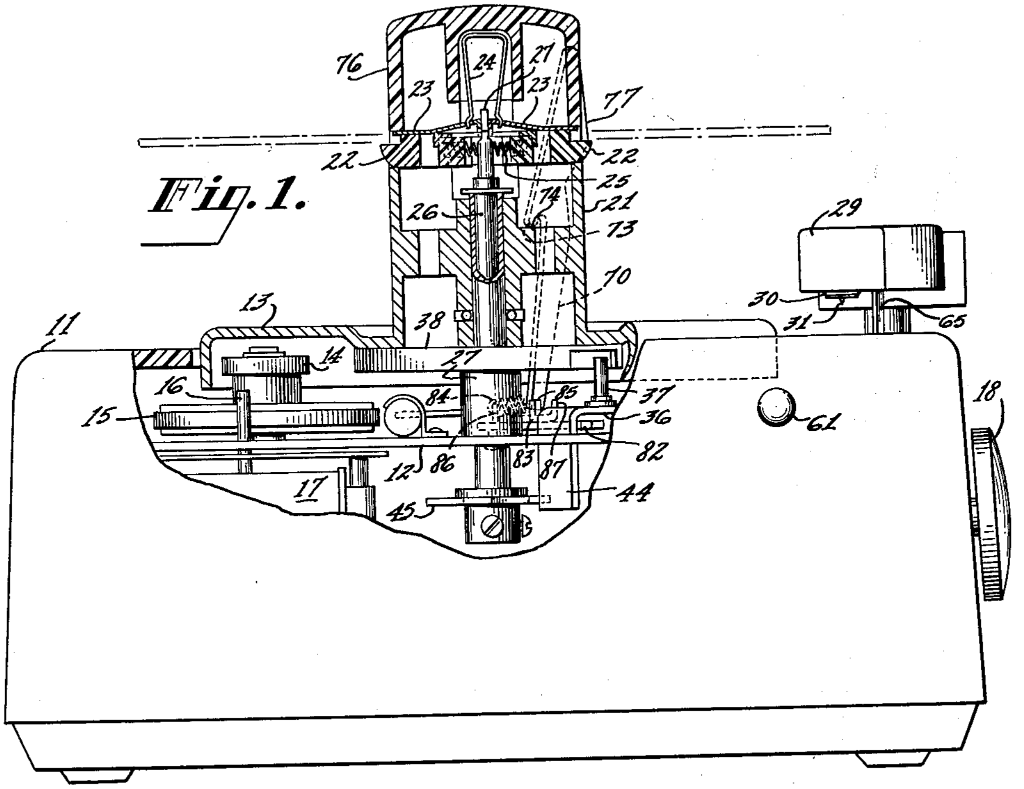
Figure 4:
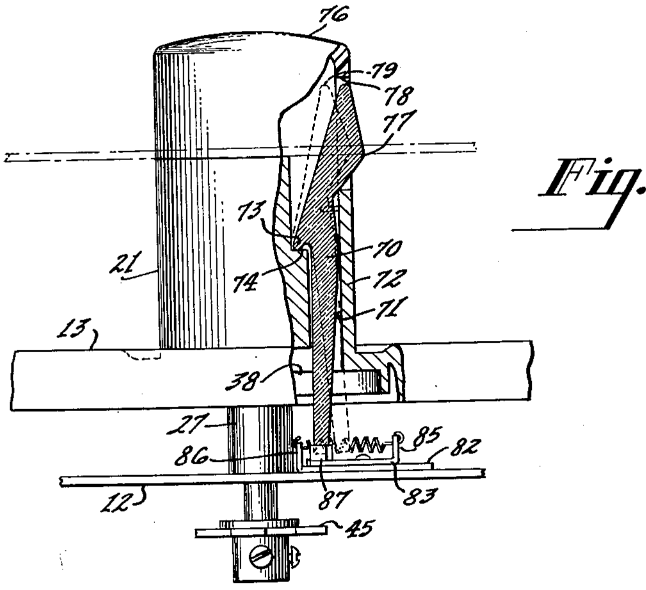
FIGURE 4 is a side view, partly in section of the spindle portion of the record changer of FIGURE 1 showing further details of construction of the tone arm stop system in accordance with the invention.
Figure 5:
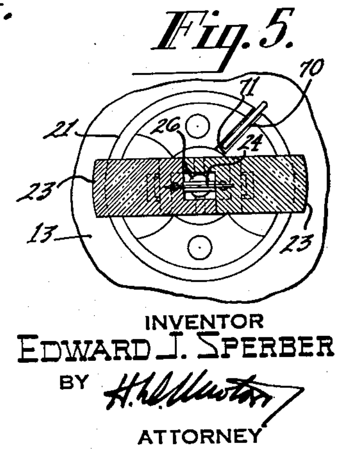
FIGURE 5 is a top view of the spindle portion of the record changer shown in FIGURE 4, with the top cover removed to show an element of the tone arm stop system.
Figure 7:
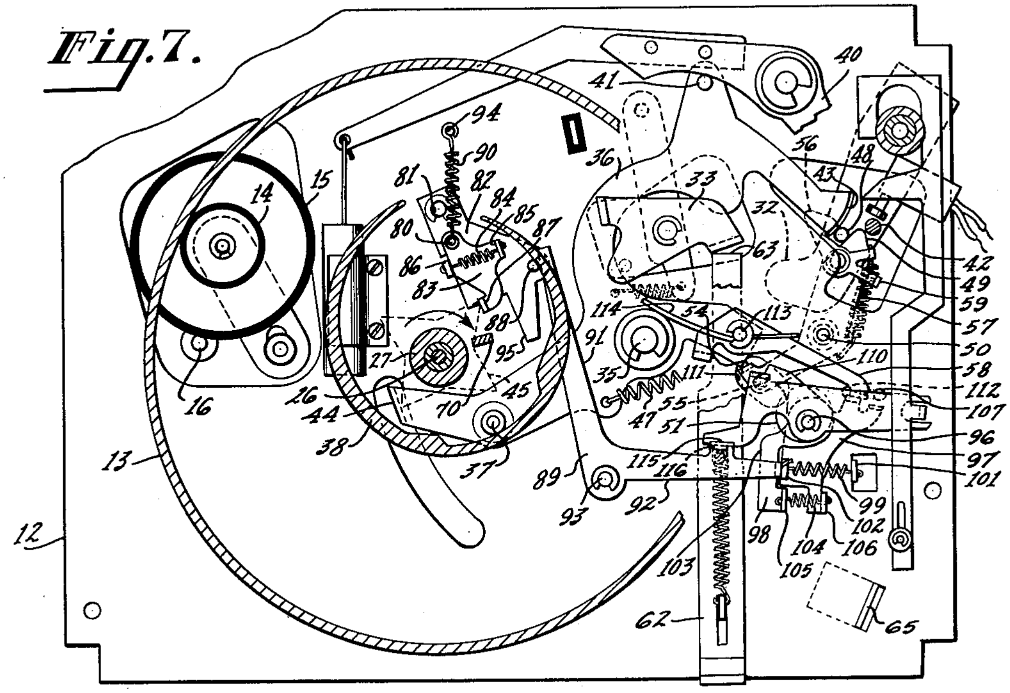
FIGURES 6, 7 and 8 are further plan views, partly in section, of the sub-base assembly of FIGURES 2 and 3 showing further details of the arrangement of the tone arm stop system in accordance with the invention, during the playing of a last record during a record change cycle following the playing of a last record and preparatory to playing a stack of records, respectively.

Referring to the drawings, in which like reference characters indicate like elements throughout, and more particularly to FIGURES 1, 4 and 5, the automatic record changer is of the large-spindle, drop type, having a casing or housing 11 in which a sub-base assembly plate or motor board 12 is supported. A turntable 13 mounted on the motor board 12 and projecting through the top of the housing 11, is driven in a clockwise direction by a rubber tire 14 mounted on a dual diameter idler wheel 15 which, in turn, is driven by a motor spindle 16 of a motor 17 in a well known manner. A control knob 18 located on the exterior of the housing 11 controls the stopping and starting of the motor 17 through a suitable power switch (not shown).

The turntable 13 is unitary with a relatively large record receiving spindle or center post 21. Located within the center post 21 is record changing apparatus comprising a pair of retractable oppositely disposed record supporting shoulders or shelves 22 and a pair of retractable oppositely disposed record separators or record separating knives or blades 23. The separators 23 are normally retracted and the shelves 22 are normally extended outwardly of the post by biasing spring means 24 and 25 respectively. A central control shaft 26 extending through the turntable 13 and into the center post 21 is provided with a flattened upper end 27 located between the shelves 22 and separators 23. As is well known, the flattened upper end of the shaft 26 is gripped between the separators 23 and normally rotates with the center post and turntable during record playing intervals. Upon immobilizing or upon braking or stopping of the shaft 26 with respect to the center post 21, the flat end 27 of the shaft operates to cam the separators 23 outwardly from the center post, thereby effecting the withdrawal of the shelves 22 to the interior of the center post, through the interconnection of each separator with an opposite shelf, as indicated.

When records to be played are stacked on the center post 21, the lowermost record of the stack rests on the oppositely disposed shelves 22, and during a record change cycle, when the separators and shelves are moved in the manner aforementioned, drops to the turntable to be played.

A pivotally mounted tone arm 29 on the top of the housing 11, carries at its free end a suitable sound reproducing or phonograph pickup device 30 which is provided with a stylus 31 for engaging record grooves. During record playing intervals, the tone arm is free to move about its pivot mounting to permit the stylus 31 to follow the grooves of a record inwardly toward the center post 21.

Figure 2:
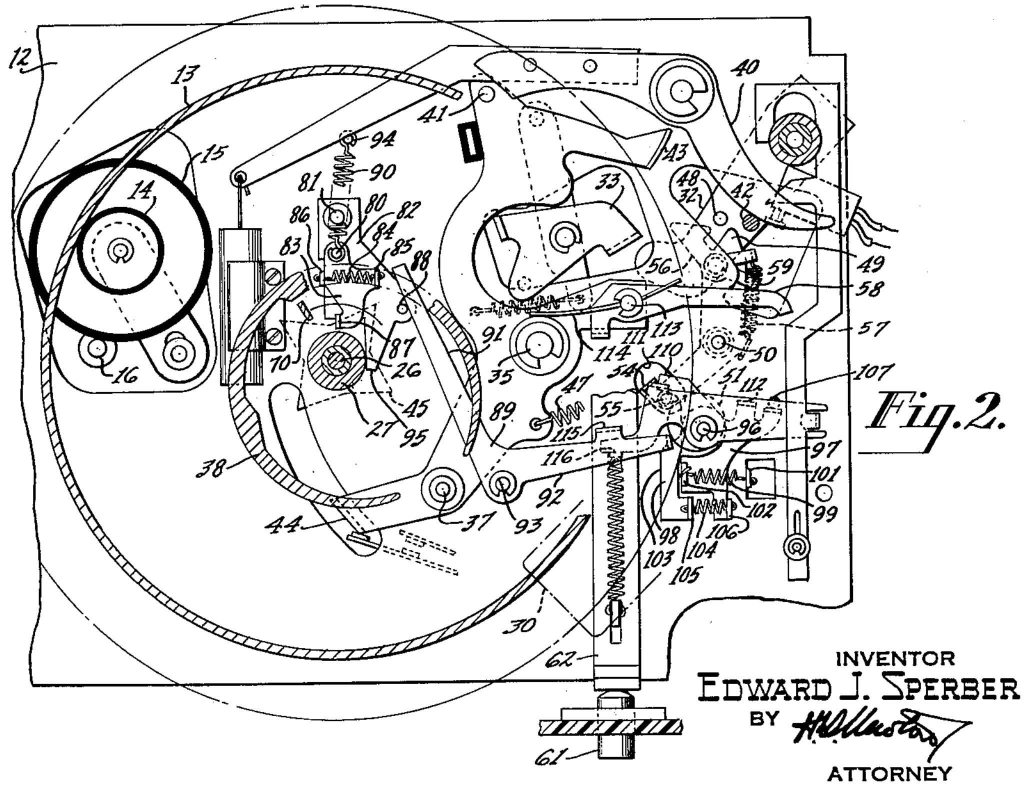
FIGURES 2 and 3 are plan views, partly in section, of a sub-base assembly of the automatic record changer of FIGURE 1, showing the operative relation of certain portions of the tone arm stop system during a normal record playing cycle or interval in accordance with the invention.
Figure 3:
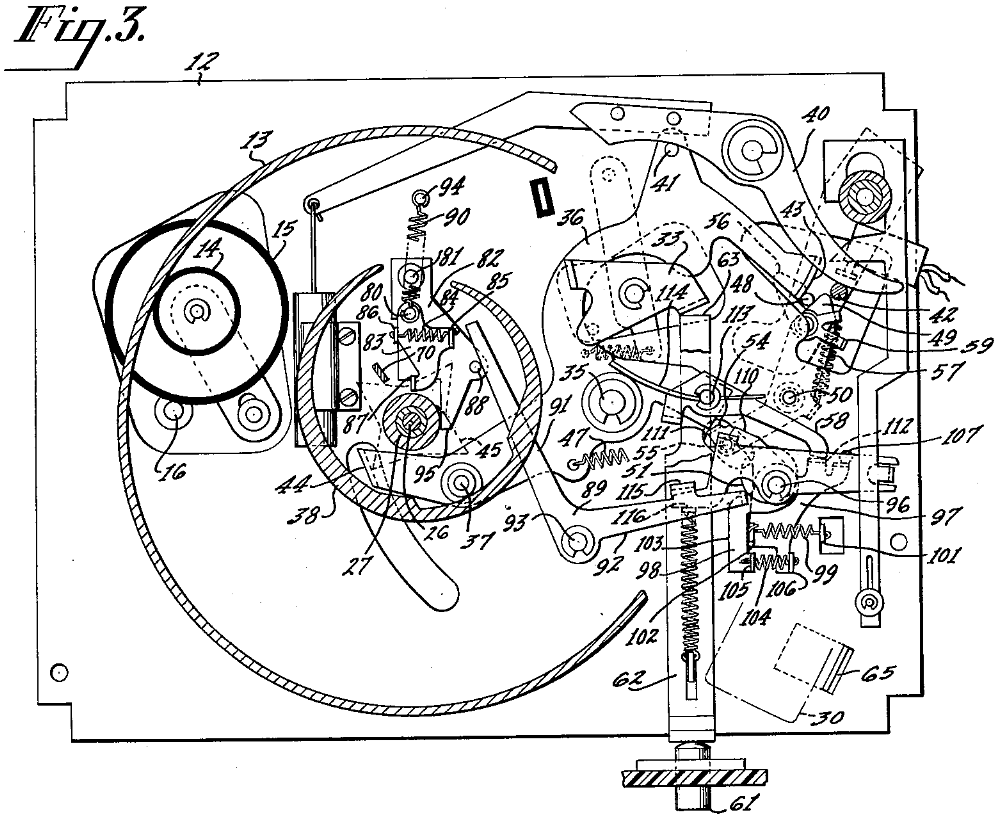
Figures 9, 10:
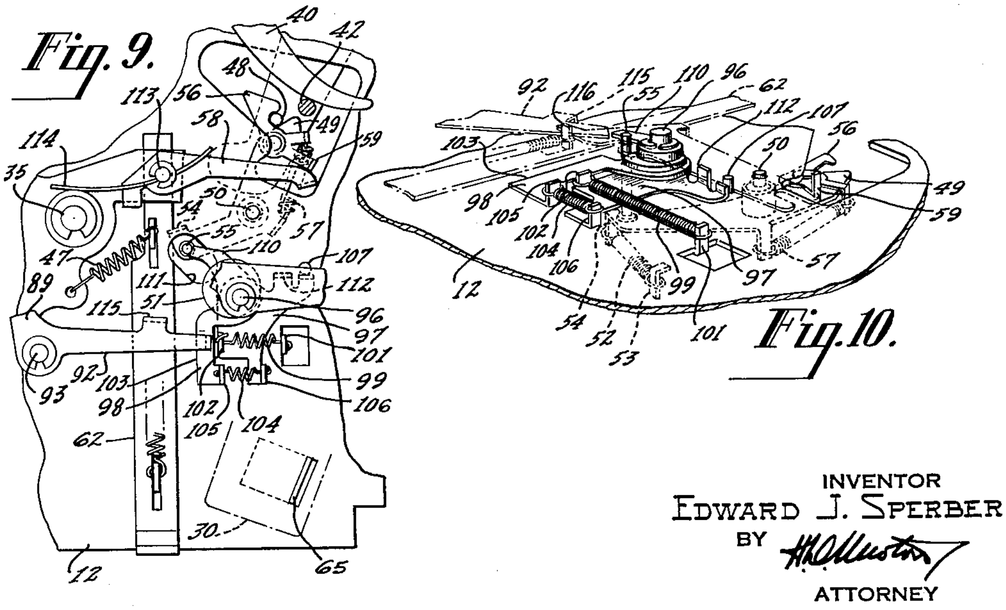
FIGURE 9 is a fragmentary plan view of the sub-base assembly of FIGURES 2, 3, 6, 7 and 8 showing the arrangement of certain of the parts thereof at the end of a change cycle after a last record has been played.
FIGURE 10 is a fragmentary view in perspective of the sub-base assembly of FIGURES 2, 3, 6, 7 and 8 further showing the constructional details of certain parts of the tone arm stop system, in accordance with the invention.
Figure 8:
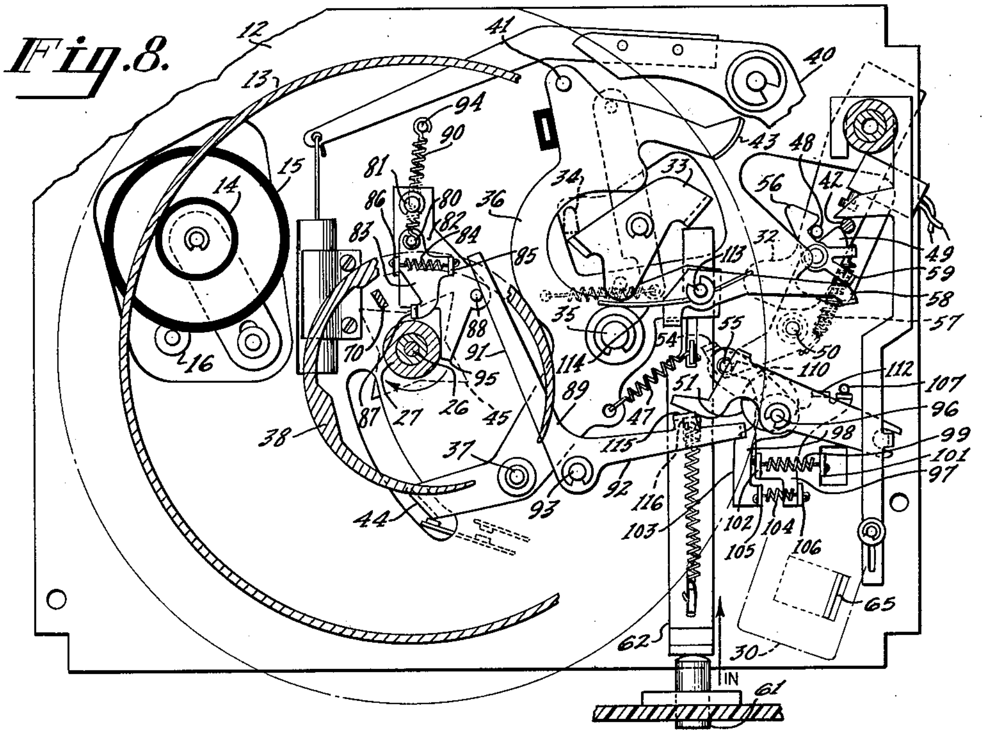
Figure 6:
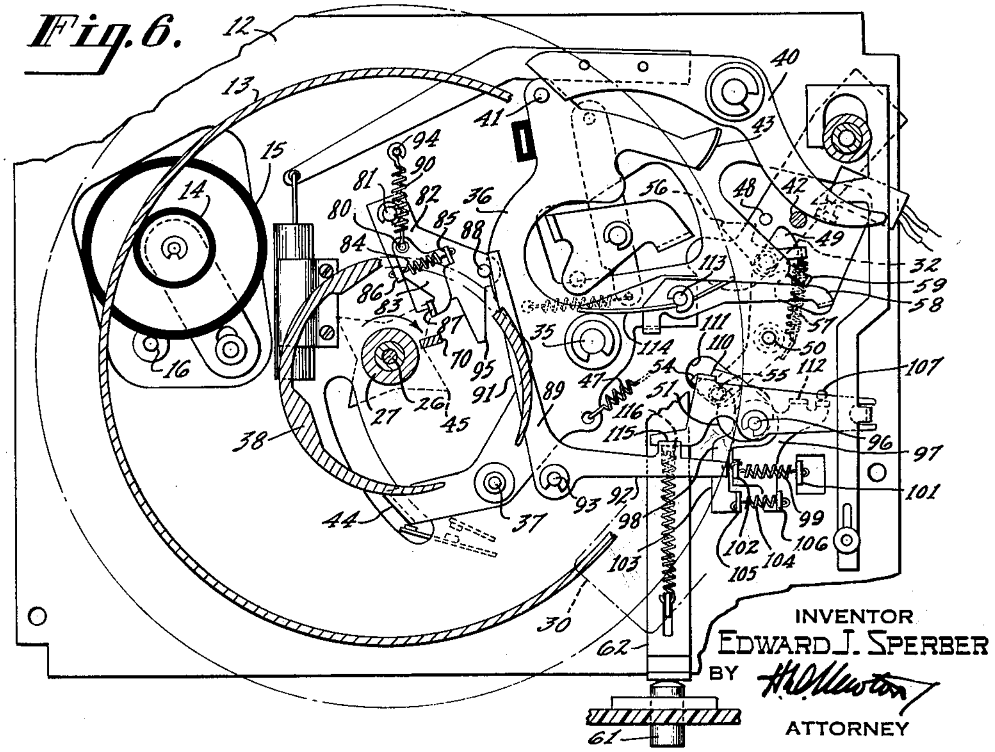

Referring now to FIGURES 2, 3 and 10, along with FIGURES 1, 4 and 5, a trip lever 32 located below the motor board 12 is fixed to the tone arm 30 for movement therewith. Near the end of a record playing interval, the trip lever 32 in a well known manner, engages a trip pawl 33 located in its path of movement and moves with the pawl for the remainder of the record playing interval. At the end of the record playing cycle or interval, the trip pawl 33 is located in the path of a tripping boss 34 fixed to the bottom of the turntable 13. The tripping boss then strikes the trip pawl 33, further rotating the trip pawl which in turn strikes a main lever 36, thereby causing the main lever 36 to turn on its pivot, whereupon a stud 37 on the main lever 36 moves toward a cycle control cam 38 fixed to the bottom of the turntable 13.

The cycle control cam 38 engages and retains the stud 37 on the main lever 36 for approximately one revolution of the turntable. During this one revolution of the turntable, the pivotal movement of the main lever 36 is controlled so that the following operations occur: The tone arm 30 is raised from the turntable 13, or a record thereon, by a tone-arm elevating lever 40, which is actuated upon engagement by a stud 41 on the main lever 36, and engages a tone arm elevating pin 42 fixed to the tone arm trip lever 32. A tone arm control end or finger 43 on the main lever 36 then engages the elevating pin 42 and effects horizontal movement of the tone arm outwardly away from the turntable 13, and a depending lug 44 on the main lever 36 adjacent the stud 37 engages a tooth of a star wheel 45 fixed to the lower end of the central control shaft 26. The control shaft 26 is held temporarily stationary, whereupon the shelves 22 and separators 23 operate in the aforementioned manner to permit the lowermost of a stack of unplayed records to drop onto the turntable or previously played record.

When the shelves and separators return to their normal biased positions, the control cam 38 releases the main lever stud 37, permitting the main lever 36 to release the star wheel 45 and the control shaft 26 to resume rotation.

During the movement of the main lever 36 under the influence of the cycle control cam 38, the trip pawl 33 is reset, by the main lever 36, to the position it occupied when first engaged by the trip lever 32. After the control cam 38 releases the main lever 36, a main lever return spring 47 effects the return of the main lever to the position it occupied when the trip pawl 33 first engaged it.

During the outward horizontal movement of the tone arm 30, a control stud 48 on the trip lever 32 engages one end of a tone arm return lever 49 pivoted to the underside of the motor board as indicated at 50, rotating the return lever 49 about its pivot during the continued outward horizontal movement of the tone arm. When the outer horizontal movement of the tone arm stops, because of the release of the main lever 36 by the cycle control cam 38, and the main lever 36 starts its return or counterclockwise movement, a biasing spring 52 (FIGURE 10) connected between a downwardly projecting stud 53 fixed to the bottom of the motor board 12 and a lug 54 on the tone arm return lever 49, effects reverse movement of the return lever 49 and consequent horizontal movement of the tone arm 30. A pin 55 projecting upwardly from the return lever 49 engages an eccentric 51 located on the motor board to halt the return lever 49 in its reverse movement at a desired position of the tone arm 30 and stylus 31 over a record to be played, such as a lead-in groove of the record.

A control or latch pawl 56 pivotally mounted on the tone arm return lever 49 and connected thereto by a spring 57 latches the trip lever control stud 48 after the control stud engages the tone arm return lever 49 during the outward movement of the tone arm. The latch pawl 56 and the return lever 49 hold the control stud 48 therebetween until the return lever is halted in its reverse movement in the manner aforementioned. The tone arm elevating lever 40 then releases its pressure against the elevating pin 42 and permits the tone arm to lower to the record, where the stylus 31 engages the record lead-in groove. When the stylus contacts the record, a pawl release arm 58 of the main lever strikes a latch pawl stud 59 to effect the release of the trip lever control stud 48, thereby freeing the trip lever 32 and tone arm 30 to permit the stylus 31 to follow the record grooves.

A push button or knob 61 is employed for pushing a start-reject bar 62 to initiate a change cycle, as for instance when the motor is turned on after a fresh stack of records is placed on the center post 21 and it is desired to effectuate the playing of the first or lowermost record of the stack, or when during a record playing interval it is desired to play the succeeding lowermost record of a stack remaining on the shelves 22. When the bar 62 is pushed inwardly, its innermost end 63 engages the trip pawl 33 and moves it to a position in the path of the tripping boss 34 to start a change cycle.

The foregoing description sets forth the operation and cooperative relation of those component parts of a record changer adapted for use of a tone arm stop system embodying the invention, and although not limited thereto, the present embodiment will further be described in connection with this form of record changer.

In the absence of an arrangement for blocking the operation of the tone arm return lever 49 after the last record of a stack has been played and a record change cycle is initiated in the manner hereinbefore described, such last record will be played again, and the playing will repeat until the changer is stopped or reloaded, or until the tone arm is lifted manually from the record and placed in an inoperative position, such as on a tone arm rest 65 for supporting the tone arm in a non-playing position away from the turntable.

In accordance with the invention, the record changer may be operated automatically in this manner to prevent repeat playing of the last record, that is, the tone arm 30 is placed automatically on the tone arm rest 65 near the end of the record change cycle initiated after the playing of the last record of a stack of records. To this end, referring particularly to FIGURES 1, 4 and 5, a sensing member or detecting device in the form of a feeler, or gravity-actuated lever 70 is pivotally mounted in the spindle or center post, to stand substantially vertically, with one end extending below the turntable 13 to a point between the turntable and the motor board 12. The feeler lever is thin and flat in one plane and stands in a close-fitting, radially-cut channel 71 in the upper portion of the center post near the outer wall 72 thereof. Intermediate between its upper and lower ends, the sensing lever 70 is provided with a rearwardly-extending pivot portion or prong 73 which rests at its downwardly extending tip on a ledge 74 within the center post. The upper end of the sensing lever 70 extends into a hollow interior portion of the center post cap 76 and is shaped along an outer edge to provide a probe or sensing nose portion 77 immediately above the top of the record supporting portions of the shelves 22, preferably at a distance above the shelves 22 less than the thickness of a record.

The pivot prong 73 is located below the center of gravity of the sensing lever. Thus by virtue of its own weight, the lever is biased so that the probe portion 73 tends to move or swing outwardly of the center post. The lever moves through an opening or slot 78 provided jointly in the cap 76 and the center post, to an extended position as indicated in FIGURE 4, in full lines, or to a retracted position as indicated in dotted lines 79, where it is held normally when one or more records are on the post in engagement with the shelves 22, by the inner peripheral edge surrounding the center hole.

The lower end of the sensing lever 70 occupies one of two positions corresponding to the two positions above described, as indicated in FIGURE 4 and as shown in cross-section in FIGURES 2, 3, 6, 7 and 8.

Associated with the lower end of the sensing lever is a sensing lever response pawl or toggle 82 to which a small escape lever 83 is pivoted as indicated at 80. The escape lever 83 is resiliently coupled to the response toggle 82 by a spring 84 connected between respective lugs 85 and 86 on the escape lever 83 and the response toggle 82. An upwardly extending target lug 87 on the escape lever 83 and an upwardly projecting stud 88 on the response toggle 82 provide striking and contacting surfaces respectively for the lower end of the sensing lever 70 and a pivoted reset lever or coupling toggle 89 in a manner hereinafter described. The connecting spring 84 enables the sensing lever response toggle 82 and the escape lever 83 pivoted thereon to follow each other and provides a desired degree of resilience which allows one to follow up the movement imparted to or by the other, thereby minimizing the danger of damage to either.

The reset lever 89 has two arms 91 and 92 which form an angle with each other, preferably an obtuse angle as shown in the present example, and is pivoted to the motor board at the vertex of the arms as indicated at 93. One arm 91 of the reset lever 89 extends past the response toggle stud 88, and in contact therewith, with the stud 88 between the target lug 87 of the escape lever 83 and the end of the arm 91 of the reset lever 89. Thus, counterclockwise movement of the response toggle 82 effects clockwise movement of the reset lever 89, and vice versa. A spring 90 is connected between a fixed stud or pin 94 on the motor board 12 and the escape lever pivot point 80, which pin 94 and pivot point 80 are on opposite sides of the pivot point 81 of the response toggle 82. In this dead-center arrangement, the spring 90, upon counterclockwise rotation of the response toggle lends emphasis to such rotational movement by providing additional biasing of the response toggle 82 in the counterclockwise direction.

Upon counterclockwise rotation of the reset lever 89 to effect clockwise rotation of the response toggle 82, in a manner hereinafter explained, a limit to such clockwise rotation of the response toggle 82 is provided by a finger 95 thereof which will contact a bushing 27 below the turntable 13 through which the central control shaft 26 extends.

The eccentric 51 is fixed to a pin 96 mounted on the motor board 12. The pin is turned to adjust the eccentric 51 for determining the tone arm landing position. Pivotally mounted on the pin 96 between the eccentric 51 and the motor board 12 are two superimposed levers 97 and 98, the lower lever 97 of which is biased in a counterclockwise direction by a spring 99 connected between two upstanding lugs 101 and 102 located respectively on top of the motor board 12 and on the lever 97. The upper lever 98 has an arm 103 in engageable relation with the lug 102 on the lower lever 97. A connecting spring 104 between lug projections 105 and 106 on the respective upper and lower levers 98 and 97 provides a resilient connection therebetween. A limit stop 107 on the motor board 12 limits the counterclockwise rotation of the levers.

A finger-like arm or finger 110 on the upper lever 98 extends over an opening 111 in the motor board 12 through which the eccentric engaging pin 55 of the tone arm return lever 49 projects. The finger 110 is biased in the counterclockwise direction by the biasing spring 99 by virtue of the intercoupling of the two superimposed levers through the connecting spring 104. The return lever pin 55 rides along the inner edge of the finger 110 and is gently engaged thereby.

With one or more records supported on the shelves 22, the probe portion 77 of the sensing lever 70, as hereinbefore explained, registers against the inner peripheral edge of the center of the record resting on the shelves 22. The lower end of the sensing lever 70 in this position of the probe portion 77 is clear of, or in a neutral position with respect to, the target lug 87 and is in an outermost position along a radial line with respect to the center of the turntable 13. The response toggle 82 in this outermost position of the sensing lever 70 is oriented so that the target lug 87 is in an innermost position with respect to the lower end of the sensing lever 70, i.e., the response toggle finger 95 is in contact with the bushing 27. The lower end of the sensing lever, which rotates in a clockwise direction with the center post 21, moves in a circular path about the target lug 87 and clear thereof.

The arm 91 of the reset lever 89 registers with the contacting stud 88 on the response toggle, and the other arm 92 of the reset lever 89 is oriented in the general direction of the eccentric 51 and is clear of the lug 102 of the lower lever 97 of the superimposed levers 97, 98.

During record change cycles, while records are supported on the shelves 22, the end of the pawl release arm 58 of the main lever 36, as shown in FIGURE 3, engages an upwardly extending lug 112 of the lowermost lever 97 located in the path of operation thereof, with consequent clockwise rotation of the superimposed levers 97, 98 occurring against the tension of the spring 99. The pawl release arm 58 is pivoted as indicated at 113, a stiff spring wire 114 between the pawl release arm 58 and the pivot 35 of the main lever 36 providing sufficient force to enable the pawl release arm 58 to move the levers 97 and 98 therewith.

The return lever pin 55, during the outward horizontal movement of the tone arm 30 in the change cycle, rides toward the end of the finger 110. At the extreme outer position of the tone arm, the pin 55 is near the end of the finger 110. The finger in its clockwise rotation moves slightly apart from the pin 55 and prevents the pin from passing beyond the end thereof. Upon reverse movement of the return lever 49, the pin 55 moves toward the eccentric 51 and the pawl release arm 58 moves to unlatch the latch pawl 56 from the trip lever pin 48 in the manner heretofore explained, whereupon the biasing spring 99 effects the counterclockwise rotation of the superimposed levers 97 and 98 to the extent permitted by the limit stop 107. The sensing lever 70, the response toggle 82 and the coupling toggle 89 remain in the positions described whenever one or more records are supported on the shelves 22.

Upon release of the last record of a stack from the shelves for playing, the tone arm moves and the stylus engages the record grooves. The probe portion of the sensing lever 70 is released to move outwardly through the opening 78, while the lower end moves to the corresponding innermost position where its path of rotational movement includes the target lug 87. As can be seen with reference to FIGURE 6, the lower end of the sensing lever 70 then strikes the target lug 87, thereby effecting counterclockwise movement of the response toggle 82 and consequent clockwise movement of the reset lever 89.

The end of the arm 92 of the reset lever 89 thereupon moves into a position adjacent the lug 102 on the lowermost of the superimposed levers 97 and 98.

At the end of the record playing interval for the last record, the record change cycle is initiated and the tone arm moves to the outermost position in the usual manner, at which point it is over the tone arm rest 65. However, as will be seen with particular reference to FIGURES 7 and 9, movement of the superimposed levers 97 and 98 is blocked by the end of the arm 92 of the reset lever 89 which is located in the path of the stud 102. The spring wire 114 is sufficiently resilient to enable the pawl release arm 58 to turn on its pivot after moving the levers 97 and 98 to the extent permitted by the end of the arm 92, thereby preventing damage to the registering parts. Because the superimposed levers cannot rotate to the extent they do in normal change cycles, the return lever pin 55 riding against the finger 110 during the outward rotational movement of the tone arm, moves beyond the end of the finger. The finger is biased for counterclockwise rotation by the spring 99 and is thus moved sufficiently to cause the pin 55 to register with the end thereof.

The pin reaches the position of registry with the end of the finger 110 above referred to, when the tone arm reaches its outermost position, i.e., over the tone arm rest 65. Thereafter the tone arm return lever 49 cannot operate to locate the tone arm over the starting groove of a record, because the end of the finger 110 blocks the return lever pin 55. The main lever 36, upon being released by the control cam 38, releases the tone arm elevating lever 40, and the tone arm lowers in the usual manner, and hence lands directly on the rest 65 where it remains. The motor can be turned off and the played records removed from the turntable whenever desired. The tapered probe portion 77 of the sensing lever permits the records to be removed without any interference.

When it is desired to again play records, the selected records are placed on the center post 21. The sensing lever being tapered also above the probe portion 77, the lowermost record of the new stack placed on the center post cams the probe portion to its innermost position. The lower or opposite end of the sensing lever thus moves to the outermost radial position aforementioned.

The start-reject bar 62 is adapted upon being moved inwardly by the push-button 61, to effect the raising of the tone arm 30 from the rest 65 in a well-known manner. In addition, means are provided for moving the reset lever 89 to permit a record playing interval to ensue, otherwise the tone arm would again lower to the rest 65 at the end of the change cycle, in the same manner as hereinbefore explained. To this end, as shown most clearly in FIGURE 8, a depending lug 115 is provided on the arm 92 of the reset lever 89, which lug is adapted to be engaged by a projection 116 extending up from the start-reject bar 62, when such bar is pushed inwardly. Upon such engagement, the reset lever 89 is rotated counterclockwise so that the superimposed levers 97 and 98 are no longer blocked.

Concurrently, the response toggle 82 is moved counterclockwise by virtue of the engagement of the arm 91 of the reset lever 89 with the response toggle stud 88, and the target lug 87 moves to the aforementioned innermost position with respect to the lower end of the sensing lever 70. Thus when the start-reject bar 62 moves the trip pawl 33 into position to initiate a change cycle, it automatically sets the response toggle 82 and reset lever 89 to permit clockwise movement of the superimposed levers 97 and 98 by the end 112 of the pawl release arm 58 in the usual manner.

When the control finger 43 of the main lever 36 reaches the tone arm elevating pin 42, and the end of the pawl release arm 58 effects the clockwise rotation of the superimposed levers, the finger 110 moves clockwise sufficiently to release the return lever pin 55 from the end thereof, whereupon the return lever biasing spring 52 effects movement of the pin 55 to contact the eccentric 51, when the tone arm is positioned over the record to be played, in the manner hereinbefore described.

The arrangement of the escape lever 83 on the response toggle 82, with the connecting spring 84 therebetween, provides a highly desirable safety feature. If the reset lever 89 is moved to reset the response toggle 82 by pushing the start-reject bar 62 inwardly in the manner hereinbefore explained, and the push button 61 is kept pressed inwardly, then the lower end of the sensing lever 70, in the absence of a record being supported on the shelves 22, will strike the target lug 87. In the absence of such safety feature, a heavy load would be placed on the turntable and driving motor, and there would be danger of damage to the sensing lever 70, the target lug 87, and other parts of the tone arm stop system. However, by virtue of the safety arrangement as above-mentioned, the escape lever 83 moves easily about its pivot 80 and permits the lower end of the sensing lever 70 to escape, thereby avoiding any possibility of damage.

From the foregoing description, it is clear that an automatic tone arm stop system for automatic record changers of the drop type embodying the invention and comprising a pivoted sensing member housed in an enlarged turntable center post, with a response mechanism below the turntable, may be provided without undue complication of the mechanism involved. Furthermore, it may readily be made to operate only after the playing of the last of a stack of records and may be set in a predetermined manner, to land and leave the tone arm on the rest and thus prevent further playing of said last record.

What is claimed is:

1. In an automatic record changer, the combination with a turntable center post for receiving a stack of records supported above the turntable, a pivoted record playing tone arm having a non-playing position of rest and a mechanism responsive to a predetermined movement of said tone arm for effecting sequential selection and playing of successive lowermost records of the stack of the record sensing member carried by said center post, said sensing member positioned to engage the inner peripheral edges of the stack of records supported above said turntable, and radially movable between a retracted inoperative position under control of said stack and an operative position extending from one side of said post upon release of the last record of said stack for playing, means including a movable target element selectively positioned for engagement by said sensing member in the operative position and means including said mechanism to position said tone arm at said non-playing position in response to the engagement of said sensing member and said target element.

2. In an automatic record changer, the combination with a rotatable record receiving turntable center post having a relatively straight central axis, a pivoted record playing tone arm, and means for periodically and automatically effecting sequential selection and playing of successive lowermost records of a stack of records supported above the turntable on said center post, of a record sensing member mounted in said center post and movable between an inoperative position substantially entirely within said center post and an operative position extending laterally from said center post, said sensing member being held in said inoperative position by said successive lowermost records and releasable by the last record of the stack after such record has been selected for playing to move to said operative position, means for moving said tone arm to a non-playing position between record playing intervals, and means operable by said sensing member in the operative position thereof to stop said tone arm in said non-playing position after said last record has been played.

3. In an automatic drop type record changer, the combination with a tone arm indexing mechanism operable at the end of a record change cycle to move a pivoted tone arm to a predetermined starting position over a record to be played, a substantially straight cylindrical turntable center post for receiving a stack of records supported above said turntable, and record changing mechanism for effecting sequential feeding of successive lowermost records from the stack onto said turntable to be played, of a tone arm stop system for preventing repeat playings of the last record of the stack comprising, a movable gravity-biased sensing member pivotally mounted in said center post adapted to engage and be retained in a first position by the inner peripheral edges of the successive lowermost records and released after said last record has been selected for playing to move to a second position extending from one side of said center post, a lever system in said mechanism movable by said sensing member in said second position from an inoperative to an operative position, and means connecting said lever system in said operative position with the indexing mechanism to hold said tone arm in a position retracted outwardly from said starting position after the last record has been played.

4. In an automatic drop type record changer, the combination as defined in claim 3, wherein the sensing member is a relatively long, thin substantially vertical lever pivoted within the center post at a point below its center of gravity and having a probe portion adjacent the upper end thereof extending exteriorly of the post for engagement with and retraction to the first position by the inner peripheral edges of successive lowermost records and a lower end extending below said center post in operative relation to said lever system in said first position, and wherein the lower end of said lever in said second position effects movement of said lever system to the operative position.

5. In an automatic phonograph record changer, the combination as defined in claim 3, wherein the indexing mechanism comprises a tone arm return lever for effecting positioning of the tone arm to play a selected record of the stack, and wherein the lever system comprises a sensing member response lever operative to block said tone arm return lever and prevent repeat playing of said last record.

6. In an automatic phonograph record changer, the combination as defined in claim 5, wherein reset means are provided for the response lever, and wherein resilient stop means are provided for the response lever in the inoperative position to permit resilient movement upon being engaged by the sensing member.

7. In a drop-type automatic record playing mechanism wherein alternate record playing and record changing intervals occur automatically, the combination with a record turntable having an enlarged center post adapted to receive and hold a stack of records and provided with record supporting and selecting mechanism therein, of a pivoted tone arm, tone arm positioning means for effecting placement of said tone arm in a predetermined position, and automatic tone arm stop means including a sensing element pivotally mounted in said center post operable upon completion of the playing of the last record of the stack to stop the operation of said tone arm positioning means at a predetermined non-playing position of said tone arm.

8. In an automatic drop type record changer, the combination as defined in claim 7, in which a tone arm rest is provided for the tone arm, and in which said tone arm positioning means includes controlling elements operable to seat and retain said tone arm on said tone arm rest after the last record has played.

9. In an automatic record changer of the drop type, the combination with a rotatable turntable having a relatively large record receiving spindle for rotation therewith for a stack of records to be played, a pivoted tone arm having a stylus at the free end thereof, and control means operable to effect sequential feeding of the lowermost record of the stack to said turntable and to position said tone arm for playing the record, of a lever system adapted to be moved to a position to block said control means from moving said tone arm to a playing position, and a sensing member pivotally mounted in said spindle operably connected with said lever system to move said lever system into said blocking position upon completion of the playing of said last record.

10. In an automatic record changer of the drop type, the combination with a rotatable turntable having a record supporting and controlling spindle for rotation therewith, a tone arm, and a movable tone arm indexing system operable to position the tone arm over a record to be played, of means for preventing further playing operations of said tone arm upon completion of the last of a stack of records supported on said spindle, said last named means comprising a gravity biased sensing member pivotally mounted in said center post, a lever system, a first portion of said lever system occupying a neutral position with respect to said tone arm indexing system during retention of records on said center post, said sensing member being biased by a lowermost one of said stack of records to a neutral position with respect to a second portion of said lever system, said gravity biased sensing member being operable upon selection of the last of said stack of records for playing to engage and move said second portion of said lever system in a predetermined manner, said first portion of said lever system is moved in response to movement of said second portion into operative relationship with said indexing system, and said indexing system upon engagement therewith by said first portion of said lever system being prevented from further positioning said tone arm for record playing operations.

11. The combination with a record changer having a rotatable central turntable spindle, record changing mechanism in said spindle for supporting a stack of phonograph records to be played and for releasing successive lowermost records for playing, a pivoted tone arm, and mechanism operable periodically to move said tone arm to an off-record position, of means for arresting said tone arm in said off-record position comprising a record sensing element mounted in said spindle and releasable to an operative position upon selection of the last record supported on said spindle for playing, and control link means operable by said sensing element in said operative position to effect release of said tone arm by said mechanism at said off-record position.

12. In an automatic drop type record changer, the combination with an enlarged rotatable turntable spindle housing record supporting and separating apparatus, and means for moving a tone arm in a predetermined manner to effect playing of a record, of a control system for preventing movement of said tone arm in said predetermined manner after the last record of a stack has been played, said control system comprising a gravity biased sensing device within said spindle, said sensing device being maintained in an inoperative position by the lowermost of a stack of records supported on said spindle and releasable to move to an operative position upon release of the last record of said stack for playing, and blocking means operable by said sensing member upon completion of playing of said last record to block the operation of said tone arm moving means, thereby to prevent further playing of said last record.

13. A stop system for an automatic record changer of the type having a rotatable turntable center post for receiving a stack of records supported above the turntable, a pivoted record playing tone arm having a rest position, and mechanism responsive to a predetermined movement of said tone arm for effecting sequential selection and playing of successive lowermost records of the stack comprising a record sensing lever pivoted in said center post, said lever being in a position to be engaged and held in a retracted position within by the records supported above said turntable and movable to a second position extending radially from said center post upon the release of the last of the stack of records to the turntable, and means including said mechanism responsive to said lever in said second position to move said tone arm to said rest position.

14. A stop system for an automatic record changer of the type having a turntable center post for receiving and supporting a stack of records above the turntable, a pivoted record playing tone arm having a non-playing position of rest, and a mechanism responsive to a predetermined movement of said tone arm for effecting sequential selection and playing of successive lowermost records of the stack comprising a record sensing lever pivotally mounted in said center post, said lever held in a first retracted position within said center post by the records supported above said turntable and radially movable with respect to said center post to a second position extending from said center post upon release of the last record of the stack to said turntable, and means including said mechanism responsive to said lever in said second position to effect positioning of said tone arm at said non-playing position of rest.

15. In an automatic record changer of the type including a turntable, a record centering spindle for receiving a stack of records to be supported above said turntable, said spindle being rotatable with said turntable, and automatic record changing mechanism, the combination of a record sensing element in said spindle, said element positioned to be engaged and held in a retracted position within said spindle by records supported above said turntable and mounted to move to a second position extending radially from said spindle in the absence of records supported above said turntable, and means responsive to said element in said second position to disable said automatic record changing mechanism.

References Cited in the file of this patent

UNITED STATES PATENTS

| | | |
|---|---|---|
| 1,568,130 | Blackwell | Jan. 5, 1926 |
| 2,333,414 | DeTar | Nov. 2, 1943 |
| 2,486,898 | Wennerbo et al. | Nov. 1, 1949 |
| 2,577,648 | Dale | Dec. 4, 1951 |
| 2,616,705 | Leonard | Nov. 4, 1952 |
| 2,707,639 | Vistain | May 3, 1955 |

FOREIGN PATENTS

| | | |
|---|---|---|
| 419,299 | Great Britain | Nov. 5, 1934 |